US005565679A

United States Patent [19]

Tanner et al.

[11] Patent Number: 5,565,679

[45] Date of Patent: Oct. 15, 1996

[54] METHOD AND APPARATUS FOR PLASMA MASS ANALYSIS WITH REDUCED SPACE CHARGE EFFECTS

[75] Inventors: Scott D. Tanner, Aurora; Donald J. Douglas; Lisa Cousins, both of Toronto, all of Canada

[73] Assignee: MDS Health Group Limited, Etobicoke, Canada

[21] Appl. No.: 338,221

[22] Filed: Nov. 9, 1994

Related U.S. Application Data

[63] Continuation-in-part of Ser. No. 59,393, May 11, 1993, Pat. No. 5,381,008.

[51] Int. Cl.$^6$ ............................ B01D 59/44; H01J 49/00

[52] U.S. Cl. ........................................ 250/288; 250/282

[58] Field of Search .................................. 250/281, 282, 250/288, 423 R

[56] References Cited

U.S. PATENT DOCUMENTS

| | | | |
|---|---|---|---|
| 4,746,794 | 5/1988 | French et al. | 250/288 |
| 4,963,735 | 10/1990 | Okamoto et al. | 250/288 |
| 4,999,492 | 3/1991 | Nakagawa | 250/288 |
| 5,051,584 | 9/1991 | Gray et al. | 250/288 |
| 5,148,021 | 9/1992 | Okamoto et al. | 250/288 |
| 5,316,955 | 5/1994 | Govorchin | 250/288 |
| 5,381,008 | 1/1995 | Tanner et al. | 250/288 |

*Primary Examiner*—Bruce C. Anderson
*Attorney, Agent, or Firm*—Bereskin & Parr

[57] ABSTRACT

A method of analyzing an analyte contained in a plasma, in inductively coupled plasma mass spectrometry (ICP-MS). A sample of the plasma is drawn through an orifice in a sampler, then skimmed in a skimmer orifice, and the skimmed sample is directed at supersonic velocity onto a blunt reducer having a small orifice therein, forming a shock wave on the reducer. Gas in the shock wave is sampled through an offset aperture in the reducer into a vacuum chamber containing ion optics and a mass spectrometer. This reduces space charge effects, thus reducing mass bias and also reducing the mass dependency of matrix effects. Since the region between the skimmer and the reducer can operate at about 0.1 Torr, which is the same pressure as that produced by the roughing pump which backs the high vacuum pump for the vacuum chamber, a single common pump can be used for both purposes, thus reducing the hardware needed. In a simplified version, the skimmer can be replaced by a small beam blocking finger which extends across a line of sight between the sampler and reducer orifices and occludes the reducer orifice from the sampler orifice.

25 Claims, 11 Drawing Sheets

METHOD AND APPARATUS FOR PLASMA MASS ANALYSIS WITH REDUCED SPACE CHARGE EFFECTS

CONTINUATION-IN-PART APPLICATION INFORMATION

This application is a continuation-in-part of application Ser. No. 08/059,393 filed May 11, 1993 U.S. Pat. No. 5,387,008, for "Method of Plasma Mass Analysis with Reduced Space Charge Effects".

FIELD OF THE INVENTION

This invention relates to plasma mass analysis with reduced space charge effects.

BACKGROUND OF THE INVENTION

It is common to analyze trace elements by injecting samples containing the trace elements into a plasma, and then sampling the plasma into a mass analyzer such as a mass spectrometer. Usually, but not necessarily, the plasma is created by a high frequency induction coil encircling a quartz tube which contains the plasma; hence, the process is usually called inductively coupled plasma mass spectrometry or ICP-MS. An example of ICP-MS apparatus is shown in U.S. Pat. Nos. 33,386 reissued Oct. 16, 1990 and 4,746,794 issued May 24, 1988, both assigned to the assignee of the present application.

Although ICP-MS systems are widely used, they have for many years suffered and continue to suffer from the serious problems of non-uniform matrix effects, and mass bias. Matrix effects occur when the desired analyte signal is suppressed by the presence of a concomitant element at high concentration. The problem occurs when a large number of ions travel through a small skimmer orifice into the first vacuum chamber containing ion optics. The ions create a space charge existing primarily in the region between the skimmer tip and the ion optics and also in the ion optics. The space charge reduces the number of ions which travel through the ion optics. A sample to be analyzed will usually contain a number of other elements in addition to the analyte element (i.e. the analyte element is embedded in a matrix of other elements), and if such other elements (often called matrix elements) are present in high concentration, they can create an increased space charge in the region between the skimmer tip and the ion optics. This reduces the transmission of the analyte ions.

In addition, in a conventional sampling interface, the ions travel through the interface at the speed of the bulk gas flow through the interface, and since all the ions have substantially the same speed, their energy increases with their mass (to a first approximation). If a matrix or dominant element is present in large concentration and has a high mass, it will persist through the space charge region more efficiently than other elements because it has a higher ion energy, and will therefore become the major space charge creating species. This worsens the space charge effect and reduces the transmission of low mass (low energy) ions more than that of high mass (high energy) ions. This effect is described in a paper entitled "Non-Spectroscopic Inter Element Interferences in Inductively Coupled Plasma Mass Spectrometry (ICP-MS)", by G. R. Gillson, D. J. Douglas, J. E. Fulford, K. W. Halligan, and S. D. Tanner, Analytical Chemistry, volume 60, 1472 (1988), and in a paper entitled "Space Charge in ICP-MS: Calculation and Implications" by S. D. Tanner, Spectrochimica Acta, volume 47B, 809 (1992).

Therefore the matrix suppression effect tends to be non-uniform, i.e. it varies with the mass of the dominant element and with the mass of the analyte element. The non-uniformity is undesirable since sensitivity is reduced for some masses, and since corrections for changes in sensitivity are mass dependent (i.e. different for each element). Further, since ion transmission is dependent on mass, there will be small but significant changes in measured isotope ratios, particularly for light isotopes.

Even without a dominant matrix element, the space charge tends to create a non-uniform mass response, in that high mass analytes are transmitted through the skimmer to the ion optics and through the ion optics more efficiently (because of their higher kinetic energy) than low mass analytes. This is called mass bias, and it is also undesirable, for the same reasons.

One way of dealing with the space charge problem, as disclosed by P. J. Turner in an article entitled "Some Observations on Mass Bias Effects in ICP-MS Systems", disclosed in "Application of Plasma Source Mass Spectrometry", editors G. Holland and A. N. Eaton, published by the Royal Society of Chemistry, United Kingdom, 1991, is to apply a high voltage to accelerate the ion beam emerging from the skimmer orifice, as close to the skimmer orifice as possible. Since space charge varies inversely with the velocity of the ions, if the ions can be accelerated, the resultant space charge will be reduced. The Turner system works well in reducing space charge effects. However it suffers from the disadvantages that it may create large energy spreads which can degrade the mass spectrometer resolution; the high voltage creates a greater likelihood of electrical discharges which can cause excessive continuum background noise; and (as do conventional ICP-MS systems) it requires large and expensive vacuum pumps.

It is therefore an object of the present invention to provide an improved method and apparatus for plasma mass analysis, in which matrix effects are made more uniform and mass bias is reduced, effectively by reducing space charge effects.

BRIEF SUMMARY OF THE INVENTION

In one of its aspects the invention provides a method of analyzing an analyte contained in a plasma, said method comprising:

(a) drawing a sample of said plasma through an orifice in a sampler member, (b) directing at least a portion of said sample, at supersonic velocity, onto a substantially blunt reducer member containing an orifice, to form on said reducer member a shock wave containing at least some of said sample portion, (c) shadowing said orifice of said reducer member from said orifice of said sampler member with a blocking member, to reduce the likelihood of clogging said orifice in said reducer member, (d) drawing a part of said sample portion through said orifice in said reducer member and into a vacuum chamber, (e) directing ions in said part into a mass analyzer and analyzing said ions in said mass analyzer.

In another aspect the invention provides apparatus for analyzing an analyte contained in a plasma, said apparatus comprising:

(a) a sampler member having a sampler orifice therein for sampling said plasma, (b) a reducer member spaced from said sampler member and having a reducer orifice therein, (c) a blocking member located between said sampler and reducer members and extending across a line of sight between said orifices in said sampler and reducer members to occlude said orifice in said sampler member from said orifice in said reducer member, (d) a vacuum chamber having an inlet wall, said reducer member forming a portion of said inlet wall, said vacuum chamber including means therein for directing, for analysis, ions from said plasma passing through said orifices, (e) said reducer member being substantially blunt adjacent said reducer orifice for a shock wave to form on said reducer member adjacent said reducer orifice and for ions in said shock wave to be drawn through said reducer orifice.

Further aspects of the invention will appear from the following description, taken together with the accompanying drawings.

DETAILED DESCRIPTION OF PREFERRED EMBODIMENTS

Figure 1:
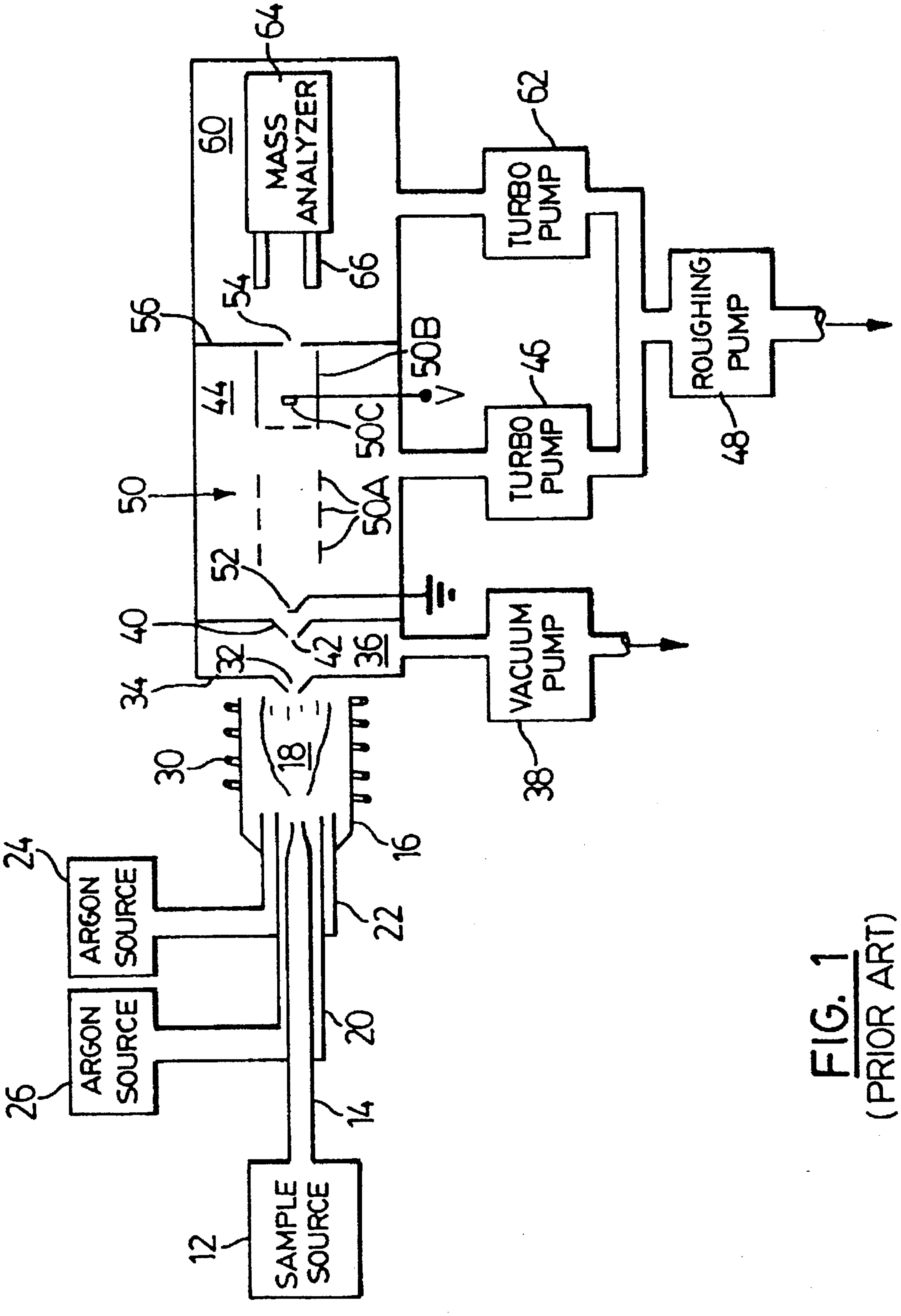
FIG. 1 (PRIOR ART)
FIG. 1 is a diagrammatic view of a prior art ICP-MS system.

Reference is first made to FIG. 1, which shows a conventional prior art ICP-MS system generally indicated by reference numeral 10. The system 10 is typically that sold under the trade mark "Elan" by Sciex Division of MDS Health Group Limited of Thornhill, Ontario, Canada (the assignee of the present invention) and is described in the above mentioned U.S. Pat. No. 4,746,794.

System 10 includes a sample source 12 which supplies a sample contained in a carrier gas (e.g. argon) through a tube 14 into a quartz tube 16 which contains a plasma 18. Two outer tubes 20, 22 concentric with tube 14 provide outer flows of argon, as is conventional. Tubes 20, 22 receive their argon from argon sources 24, 26 which direct argon into tubes 20, 22 in known manner.

The plasma 18 is generated at atmospheric pressure by an induction coil 30 encircling the quartz tube 16. Such torches are well known. Plasma 18 can of course also be generated using microwave or other suitable energy sources.

As is well known, the plasma 18 atomizes the sample stream and also ionizes the atoms so produced, creating a mixture of ions and free electrons. A portion of the plasma is sampled through an orifice 32 in a sampler 34 (protected by water cooling, not shown) which forms a wall of a first vacuum chamber 36. Vacuum chamber 36 is evacuated to a moderately low pressure, e.g. 1 to 5 Torr, by a vacuum pump 38.

At the other end of vacuum chamber 36 from sampler 34, there is located a skimmer 40 having an orifice 42 which opens into a second vacuum chamber 44. Vacuum chamber 44 is evacuated to a much lower pressure (e.g. $10^{-3}$ Torr or less) than is vacuum chamber 36, such evacuation being by a separate turbo vacuum pump 46, backed by a conventional mechanical roughing pump 48 (since turbo pumps normally must discharge into a partially evacuated region).

Vacuum chamber 44 contains ion optics generally indicated at 50 and typically being as described in U.S. Pat. No. 4,746,794. As there described, the ion optics 50 include a three element einzel lens 50A, followed by a Bessel box lens 50B, biased as referred to in said patent. Bessel box lens 50B contains a conventional center stop 50C. Vacuum chamber 44 also contains a shadow stop 52 as described in said patent, to block debris from the plasma from reaching the ion optics. Other forms of ion optics may also be used.

The ions emerging from the ion optics 50 travel through an orifice 54 in a wall 56 and into a third vacuum chamber 60. (Orifice 54 forms the rear Bessel box aperture.) Vacuum chamber 60 is evacuated by a second turbo pump 62 which is also backed by the roughing pump 48. (Diffusion or other suitable high speed vacuum pumps may be used instead of the turbo pumps 46, 62..) Vacuum chamber 60 contains a mass analyzer 64 which is typically a quadrupole mass spectrometer, but may be any other form of mass analyzer, e.g. an ion trap, or a magnetic sector analyzer. Short AC-only rods 66 (which have a variable RF voltage applied to them, but only a fixed DC bias) are used to focus ions into the mass spectrometer 64. The staged pumping in chambers 44, 60 and the two turbo pumps 46, 62 are used to avoid the need otherwise to use an exceptionally high speed vacuum pump, such as a cryopump.

In use, gas from the plasma 18 is sampled through sampler orifice 32 and expands in first vacuum chamber 36. A portion of such gas travels through skimmer orifice 42 into second vacuum chamber 44. The main purpose of the skimmer 40 is to reduce the gas load in vacuum chamber 44 to one that pump 46 can handle.

Ions and electrons from the plasma travel with the plasma gas through sampler orifice 32. Ions and electrons then pass through skimmer aperture 42, carried by the bulk gas flow. The ions are then charge separated from the electrons, partly because of the low pressure in chamber 44 and partly because of the ion optics 50 and the bias potentials thereon. The ions are focused, by the ion optics 50, through orifice 54 and into the mass analyzer 64. The mass analyzer 64 is controlled in known manner to produce a mass spectrum for the sample being analyzed.

As discussed, the ion beam travelling through the region between the skimmer orifice 42 and the ion optics 50 is affected by the space charge formed after the ions travel through the orifice 42. The result is that while a relatively large ion current (typically about 1,500 microamperes) is calculated to pass through the skimmer orifice 42, only a very small ion current is transmitted to the ion optics 50. The measured current with a distilled water sample is about 6 microamperes. With a solution containing heavy elements at a high concentration, e.g. 9,500 micrograms per milliliter (ppm) uranium, the measured current increases to about 20 microamperes. The low transmission is caused in large part by space charge effects. Mathematical modelling indicates that the enhanced transmission of heavier ions further attenuates the transmission of lighter analyte ions, and this is consistent with the mass dependency of matrix effects observed in ICP-MS. Modelling shows that even in the absence of a matrix element, the space charge will attenuate the ion current of lower mass ions more than that of higher mass ions, giving rise to discrimination against low masses. The resultant non-uniform response leads to greater difficulty in calibrating the instrument and in detecting low mass ions.

In the past, workers have attempted to achieve higher sensitivity and more uniform response by accelerating the ion beam through the ion optics 50 by using a high voltage, or by using a larger skimmer orifice. Both these approaches have serious disadvantages, as mentioned. Because the gas density in this region (close to the skimmer) is comparatively high, the high voltage approach may create large energy spreads which can degrade the resolution of the mass analyzer, and it increases the risk of electrical discharges which can increase background continuum noise. Making the skimmer orifice larger can increase the sensitivity but makes the space charge effects worse (because more ion current is transmitted), causing more severe matrix effects. A larger orifice also requires higher speed and more expensive pumps.

Therefore, the invention uses a completely different approach. According to the invention, instead of attempting to increase the ion current (in ways which produce new problems), the ion current transmitted to the ion optics is reduced. Although this is diametrically opposed to conventional techniques, the inventors have realized that the ion current transmitted into conventional ICP-MS instruments is reduced in any event, and that the reduction can be generated in a productive manner which will reduce the mass dependency of matrix effects, and which will also reduce low mass discrimination. Other benefits, e.g. reduced mass dependence of the energies of the ions transmitted into the ion optics, and reduced pumping requirements, can also be achieved, as will be described.

Figure 2:
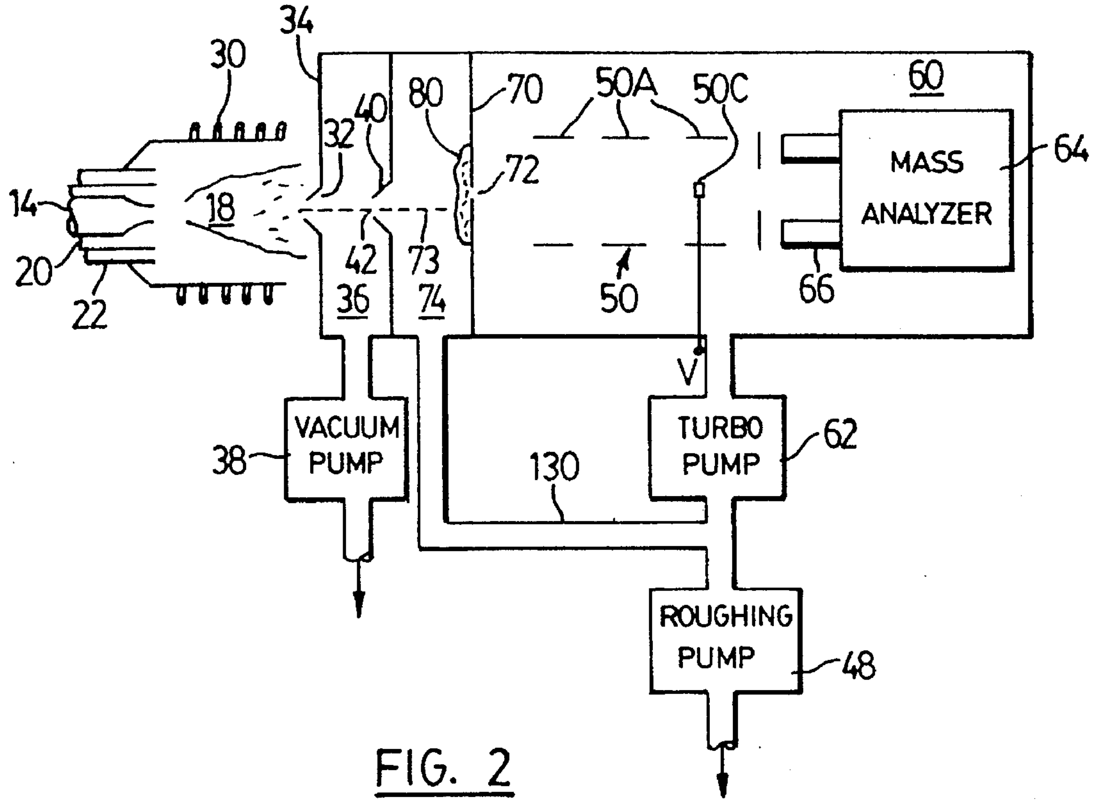
FIG. 2 is a view similar to that of FIG. 1 but showing an improved interface according to the invention.

As shown in FIG. 2, where corresponding reference numerals indicate parts corresponding to FIG. 1, the reduction in ion current is preferably achieved by employing a secondary skimmer or reducer 70 downstream of the skimmer 40. Reducer 70 contains a small orifice 72, preferably smaller in diameter than that of skimmer orifice 42 or sampler orifice 32. For example, while the sampler orifice 32 may typically be about 1.24 mm in diameter, and while the skimmer orifice 42 may typically range between about 0.5 and 1.2 mm in diameter, reducer orifice 72 is typically between 0.10 and 0.50 mm in diameter, and typically toward the smaller end of this range. Reducer 70 forms the downstream wall of an intermediate vacuum chamber 74, between vacuum chambers 36, 60. Vacuum chamber 44 has been removed and the ion optics 50 have been placed in vacuum chamber 60. Reducer orifice 72 is also offset from the common axis 73 of orifices 32, 42, e.g. by about 1.9 mm (center to center distance). Vacuum chamber 60 is still pumped by the turbo pump 62 and roughing pump 48, but chamber 74 is pumped only by roughing pump 48, as will be described.

In FIG. 2 the ion optics 50 have been modified slightly, by removing the Bessel box lens 50B and by moving its stop 50C into the last (most downstream) cylindrical lens element 50A of the einzel lens 50. However if desired the same ion optical arrangement as that shown in FIG. 1 may be used, or other ion optical arrangements may be used.

Preferably all three plates, namely sampler 34, skimmer 40 and reducer 70, are electrically grounded. Alternatively any or all of these plates, particularly the reducer 70, may be electrically biased relative to each other, but by a low voltage, e.g. 10 volts or less. When the voltage on all three plates 34, 40 and 70 is the same or differs only slightly (e.g. by not more than about 10 volts DC), then the plasma 18 tends to be extracted through their orifices as a substantially neutral plasma, i.e. free electrons and positive ions remain in relatively close proximity. Charge separation in chambers 36, 74 is in any event inhibited by the pressures therein, which pressures will now be described.

The pressures in vacuum chamber 36 (between sampler 34 and skimmer 40) and in vacuum chamber 74 (between skimmer 40 and reducer 70) are preferably arranged for a shock wave to form on reducer 70. The pressure in chamber 36 is typically about 1 to 5 Torr, while the pressure in chamber 74 is typically between 0.5 Torr and $10^{-3}$ Torr, preferably about 0.1 to 0.3 Torr. With these pressures, the plasma 18 (which is at atmospheric pressure) expands through orifice 32 to produce supersonic flow in chamber 36. A portion of the supersonic flow passes through orifice 42 and impinges on reducer plate 70, forming a shock wave 80 which spreads across the upstream surface of plate 70. In the shock wave 80, the directed velocity of the gas goes from supersonic (i.e. greater than the local speed of sound) to virtually zero in only one or a few mean free paths, typically in 0.5 mm or less. The kinetic energy of the gas is thus converted to thermal energy, and the temperature and pressure in shock wave 80 increase dramatically. For example the temperature in the shock wave increases to approximately 90% of the original plasma temperature.

Figure 3:
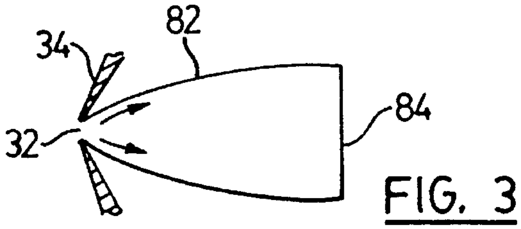
FIG. 3 is an enlarged view of a sampler used in ICP-MS systems.

As shown in more detail in FIG. 3, the gas from the plasma expands through sampling orifice 32 in a free jet 82. The free jet if undisturbed would normally terminate downstream of orifice 32 in a Mach disk 84. The distance between the Mach disk 84 and the orifice 32 is given by the known relation $$\frac{x_m}{D_0} = .67\sqrt{\frac{P_0}{P_1}}$$

where $x_m$ is the distance between orifice 32 and the Mach disk 84, $D_0$ is the diameter of orifice 32, and $P_0$ and $P_1$ are the pressures in the plasma and in the chamber 36 respectively. Preferably the skimmer tip should be upstream of the Mach disk 84, i.e. within distance $x_m$ of the aperture 32.

Figure 4:
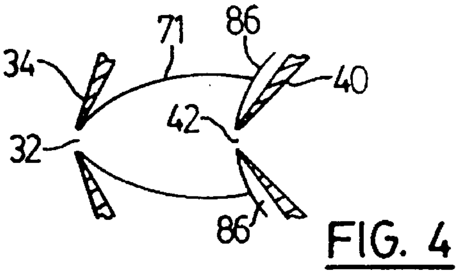
FIG. 4 is an enlarged view of a sampler and skimmer used in ICP-MS systems.

As shown in FIG. 4, no shock wave forms at the skimmer orifice 42; instead, the gas simply streams through such orifice. This is because the skimmer 40 is sharp tipped, i.e. it is a relatively sharp cone (typically the angle between its two exterior sides as viewed in cross-section is about 60 degrees), so that the gas impinging on it does not suddenly have its velocity reduced to zero. (A shock wave may however attach to the sides of the skimmer cone, as indicated at 86.) Then, when the gas flowing through skimmer aperture 42 impacts flat reducer plate 70, the shock wave 80 is formed.

Normally the skimmer orifice 42 will be placed very close to the sampler orifice 32, e.g. within 5 to 10 mm. The distance between the skimmer orifice 42 and the reducer orifice 72 can range between about 3 and 20 mm, although about 8 mm to 10 mm is preferred. However the optimum reducer position may vary depending upon the diameter of the sampler, skimmer and reducer orifices and the downstream distance of the skimmer from the sampler.

Figure 4A:
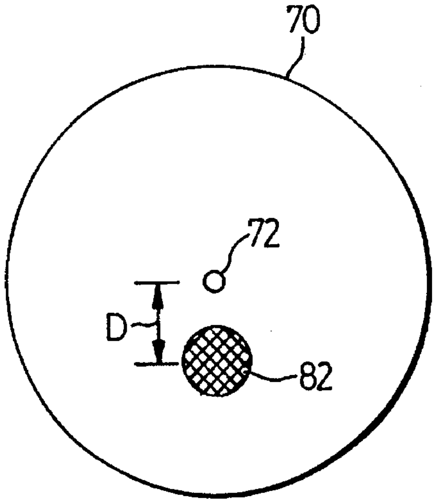
FIG. 4A is a plan view of a reducer plate showing deposit of material thereon.

Because the gas in shock wave 80 is at relatively high pressure (e.g. 2 to 4 Torr) and numerous collisions occur in the shock wave, all of the ions in the shock wave 80 acquire approximately the same (thermal) energy. Because the shock wave 80 spreads across plate 70, it can then be sampled through offset reducer orifice 72. The offsetting of orifice 72 does not cause any significant loss of ion signal as compared with having orifice 72 aligned with orifices 32, 42, because of the presence of shock wave 80. However the offsetting of orifice 72 ensures that photons travelling through orifices 32, 42 are largely blocked from entering vacuum chamber 60 and causing continuum background signal. In addition, contaminant materials from the plasma which may otherwise tend to plug the small orifice 72 impact harmlessly on the plate 70 beside orifice 72. Refractory materials such as aluminum oxide, which can tend to clog very small orifices, and which are extremely difficult to clean, can thus accumulate on plate 70 without interfering with transmission through orifice 72. This effect is shown in FIG. 4A, in which the deposit of material from the plasma through orifices 32, 42 onto plate 70 is shown at 82. Distance D is, as mentioned, typically 1.9 mm.

Figure 5:
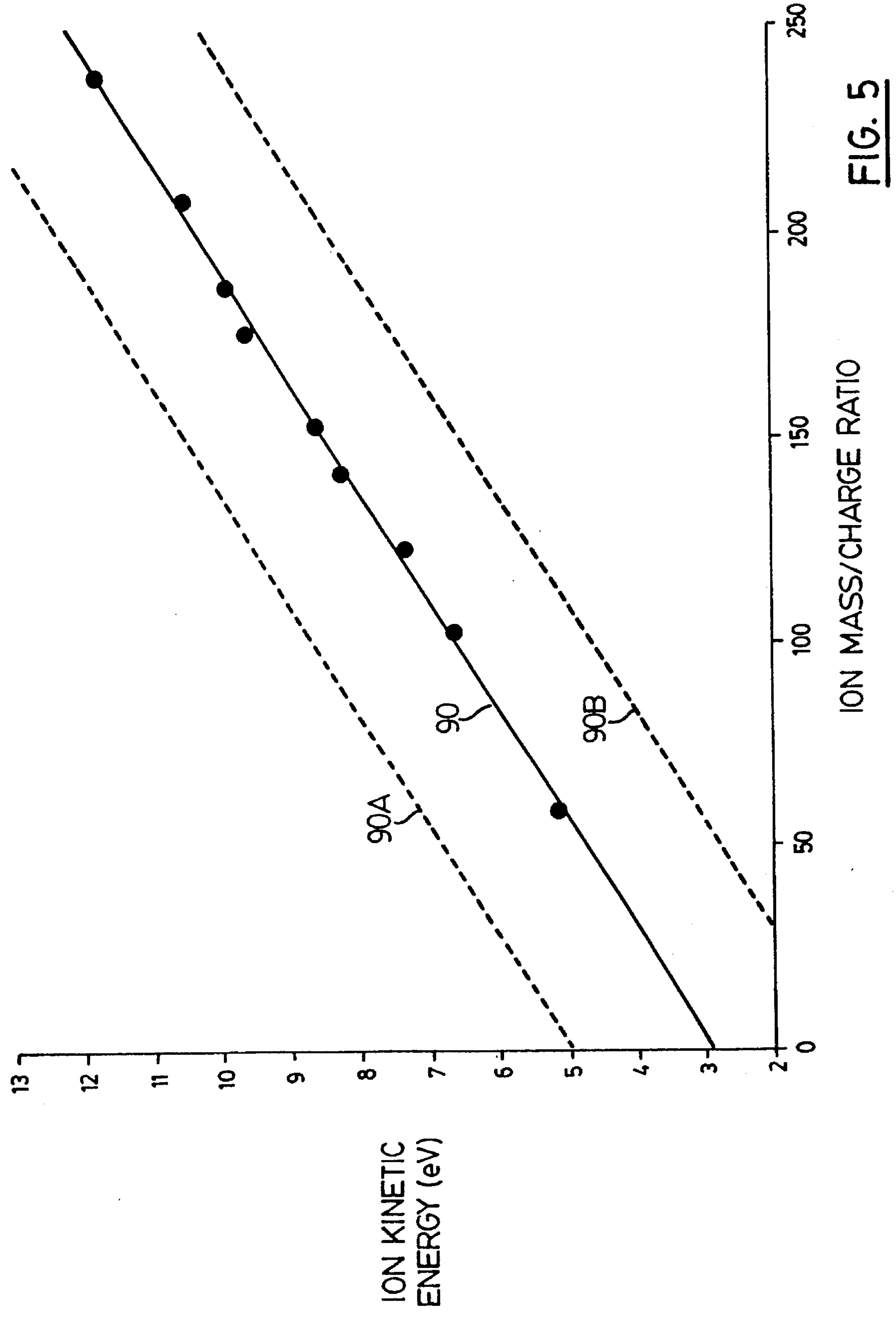
FIG. 5 is a graph showing ion kinetic energy in electron volts versus ion mass to charge ratio for the prior art instrument of FIG. 1.
Figure 6:
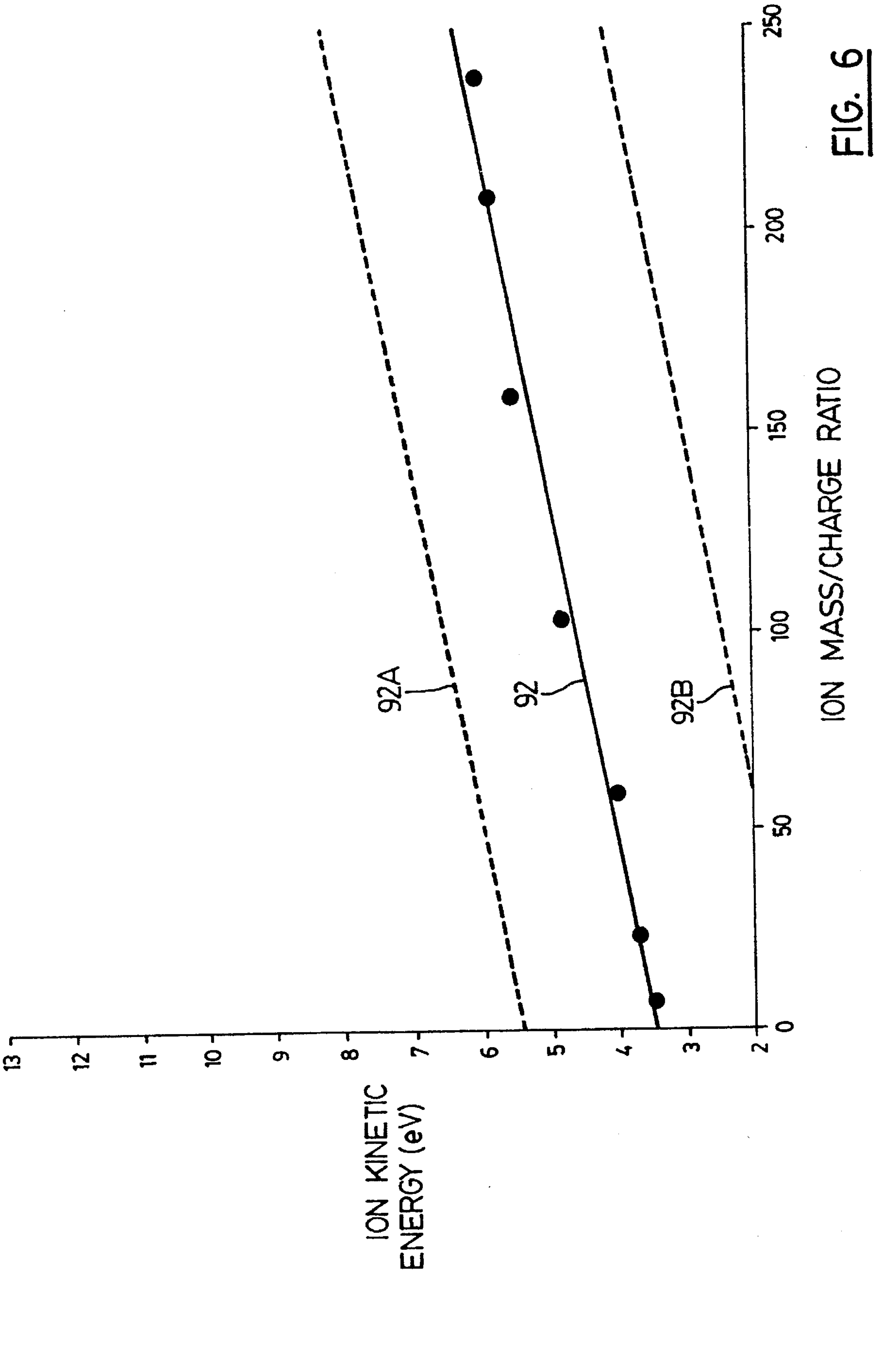
FIG. 6 is a graph showing ion kinetic energy in electron volts versus ion mass to charge ratio for the system of FIG. 2.

Because of the reduced density of the shock wave (as compared with the original plasma 18) and because of the small diameter of the reducer orifice 72, ions expanding through the reducer orifice have, downstream of the reducer orifice, very few collisions (e.g. of the order of about 1 to 10 collisions each instead of 100 to 200 collisions downstream of the skimmer orifice 42). Under these conditions the expansion into the ion optics 50 is nearly effusive, rather than being characterized by pure continuum flow. (In continuum flow, which for example characterizes the flow through skimmer orifice 42, all the ions expand with the same velocity, usually the bulk velocity of the gas which carries them.) Since the flow through the reducer is largely effusive, the mass dependence of the ions downstream of the reducer orifice 72 is reduced as compared with a standard system. The reduction in mass dependence of the ion energies is illustrated in FIGS. 5 and 6, which plot ion mass to charge ratio on the horizontal axis and ion kinetic energy in electron volts on the vertical axis. FIG. 5 is a plot made using the standard "Elan" (trade mark) prior art instrument illustrated in FIG. 1, while FIG. 6 was made using an instrument of the form shown in FIG. 2.

In FIG. 5, curve 90 illustrates the most probable relationship of ion kinetic energy to ion mass/charge ratio. Since there is in fact an approximately Gaussian distribution of ion energies about curve 90, curves 90A and 90B represent the normal half height (on the distribution curve) limits of the ion energy distribution, typically about 4 electron volts wide and thus ranging about 2.0 electron volts above and below curve 90. The slope of curve 90 represents the mass dependence of the ion energies, and the vertical distance between curves 90A, 90B represents the half height energy distribution at each mass. It will be seen from FIG. 5 that the most probable ion energies (curve 90) range from about 3 electron volts at very low mass to charge ratios, to about 12 electron volts at a mass to charge ratio of 238 (uranium).

In FIG. 6 curve 92 represents the most probable relationship of ion kinetic energy to ion mass/charge ratio, while curves 92A, 92B again represent the upper and lower half height limits of the ion energy distribution. It will be seen that the difference in the ion energies between the lower and upper ends of the mass range was much smaller than in FIG. 5. As a result of the low mass dependence of the ion energies, the ion energy distribution at mass/charge ratio 238 (between about 4.1 and 8.1 eV) overlaps the ion energy distribution (1.5 to 5.5 eV) at the lower end of the mass scale. Since the focusing characteristics of ions in the ion optics 50 commonly vary with ion energy (many ion optic systems are sensitive even to a difference as small as a few electron volts), it is found that when the reducer plate 70 is used, ions in the ion optics 50 can be focused more uniformly.

Figure 7:
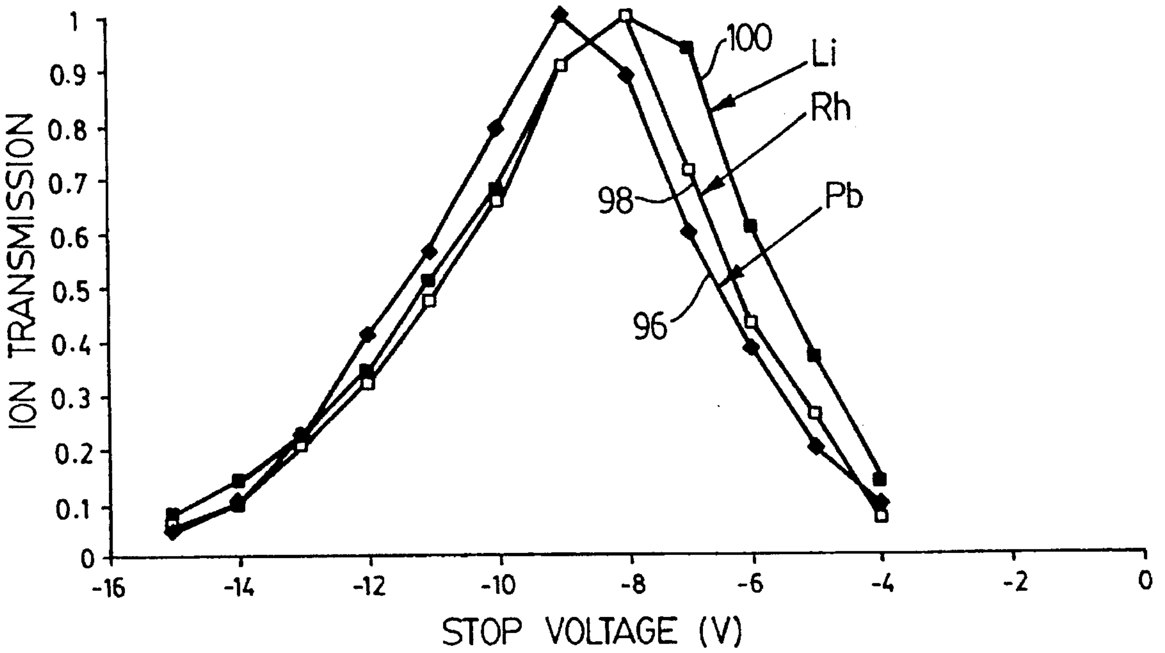
FIG. 7 is a graph showing mass dependence of the optimization of the stop voltage for the FIG. 2 instrument.

Because the ion energies are more uniform, and because therefore the ion transmissions for most elements optimize at approximately the same voltage settings in the ion optics, several benefits result. Firstly, it is easier to set up the system for operation, i.e. one setting of the voltages on the ion lenses remains optimum for all or most elements. For example if the instrument is adjusted for maximum response at mass to charge ratio 103, the operator will know that the response will also be approximately optimum for other elements. This is best shown in FIG. 7, which plots on the vertical axis ion transmission for three different elements, versus (on the horizontal axis) the voltage on the center stop 50C of the ion lens 50 (this is one of the voltages which must be adjusted on the version shown for the ion optics). In FIG. 7 curve 96 is for the element lead, curve 98 is for the element rhodium, and curve 100 is for the element lithium. It will be seen that all three curves are approximately optimum for a stop voltage of about −8 volts. This may be contrasted with the situation shown in FIG. 5 of U.S. Pat. No. 4,746,794, where the ion transmissions for different elements each optimized at a substantially different voltage.

It is found that the ion current transmitted through reducer orifice 72 into the ion optics 50 in the FIG. 2 arrangement is far less than the ion current transmitted through the skimmer orifice 42 into the ion optics 50 in the FIG. 1 arrangement. For example, while in the FIG. 1 arrangement the ion current transmitted to the ion optics may range from about 6 to 20 microamperes, the ion current downstream of the reducer orifice 72 in the FIG. 2 arrangement is measured as being only about 10 to 100 nanoamperes, or roughly 200 to 600 times smaller. Nevertheless, the FIG. 2 instrument had sensitivity as high as or higher than that of the FIG. 1 instrument, as will be described. This result indicates that most of the current transmitted through skimmer orifice 42 in the FIG. 1 instrument was being lost in the space charge region.

Because the ion current transmitted through reducer orifice 72 in the FIG. 2 instrument is so small, space charge effects are greatly reduced. This reduces both mass bias and non-uniform matrix effects. Mass bias is further reduced since ions travelling through reducer orifice 72 have reduced variation of energy with mass (as shown in FIG. 6).

Figure 8:
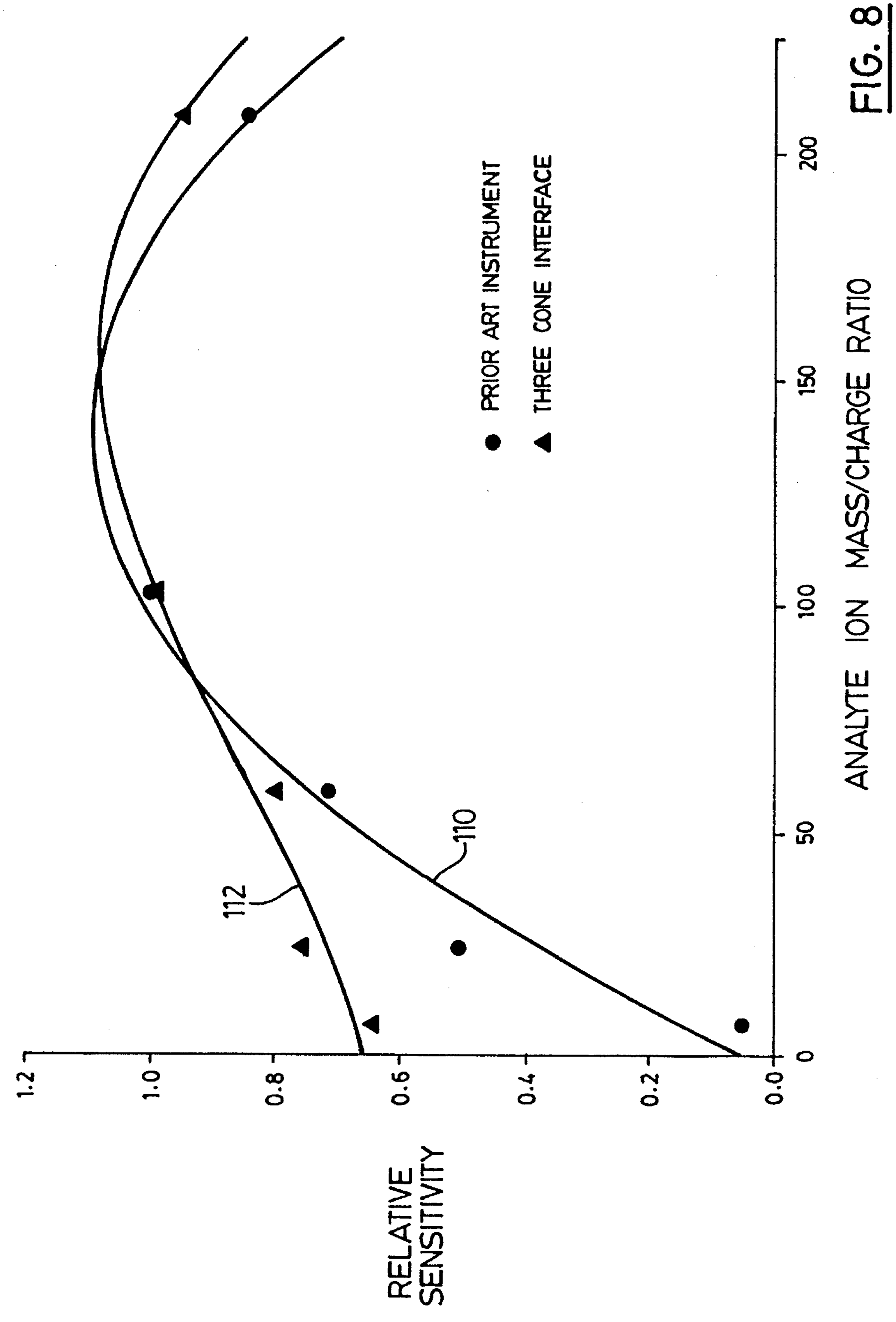
FIG. 8 is a graph showing relative sensitivity versus analyte ion mass to charge ratio, for a prior art instrument and for an embodiment of the invention.

An example of the reduction in the mass bias produced by the FIG. 2 instrument is shown in FIG. 8, where relative sensitivity is plotted on the vertical axis, against analyte ion mass to charge ratio on the horizontal axis. No matrix elements were present. Relative sensitivity is defined as the sensitivity of the instrument to one element divided by the sensitivity to another element. To produce FIG. 8, the following elements were used: lithium (mass/charge ratio= 7), magnesium (mass/charge ratio= 24), cobalt (mass/charge ratio= 59), rhodium (mass/charge ratio= 103), and lead (mass/charge ratio= 208). The sensitivities for the elements plotted were normalized to the sensitivity for rhodium, and thus the relative sensitivity for rhodium was 1.0. (The above numbers are corrected for isotopic abundance.)

Curve 110 in FIG. 8 is a mass bias response curve for a standard FIG. 1 "Elan" (trade mark) instrument. It will be seen from curve 110 (which is typical of presently available instruments) that the relative sensitivity varies greatly with analyte mass, particularly at low masses. The "Elan" (trade mark) instrument had a standard sampler and skimmer, as shown in FIG. 1.

Curve 112 in FIG. 8 is a mass bias response curve using an ICP-MS instrument of the FIG. 2 design. The reducer orifice 72 was 0.2 mm in diameter and was 15 mm from the sampler orifice 34; the skimmer orifice 42 was 5 mm from the sampler orifice 34 (i.e. the reducer orifice was 10 mm from the skimmer orifice), and the voltages on the sampler, skimmer and reducer were all 0 volts (all were grounded). The sampler and skimmer orifices 32, 42 were 1.1 mm and 0.8 mm in diameter respectively, and the pressures in chambers 36, 64 and 60 were 4 Torr, 0.2 Torr and $2\times10^{-5}$ Torr respectively. While curve 112 still varies with mass, its mass dependency is much reduced. For example at low mass, e.g. at the first measurement point (lithium), the relative sensitivity is increased by more than ten times.

While FIG. 8 shows only relative sensitivity, in fact absolute sensitivity of the order of about 3 million to 10 million counts per second per ppm has been achieved with the FIG. 2 instrument at mass/charge 103 (rhodium), depending on orifice sizes used. This compares with a sensitivity of about 5 million counts per second per ppm for rhodium for a standard "Elan" (trade mark) instrument as shown in FIG. 1, and of course for the FIG. 2 instrument the sensitivity varied much less with mass. In addition, only one high speed vacuum pump is needed instead of two.

Figure 9:
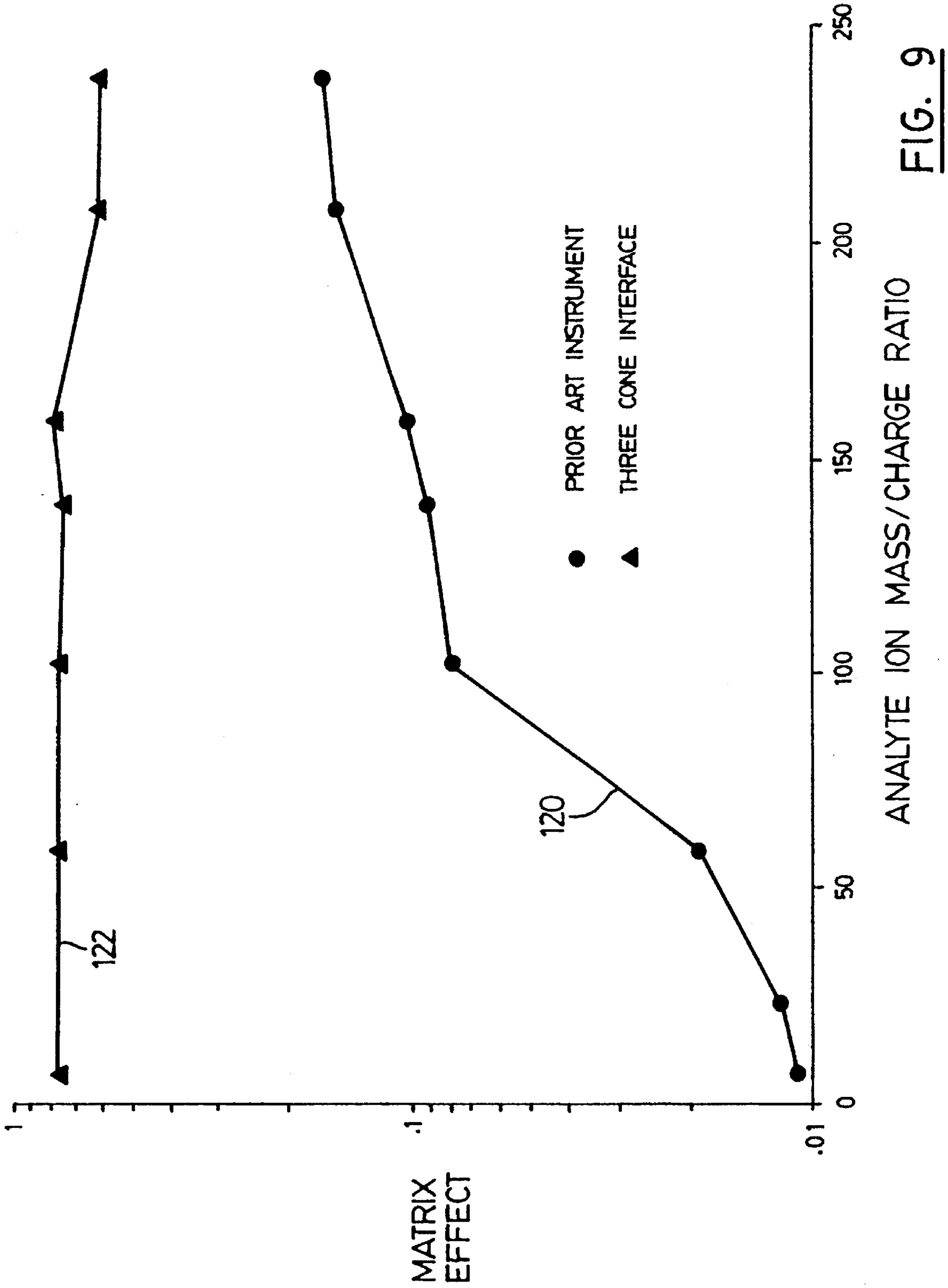
FIG. 9 is a graph showing matrix effect versus analyte ion mass to charge ratio, for a prior art instrument and for an embodiment of the invention.

Reference is next made to FIG. 9, which compares the matrix effects in a standard "Elan" (trade mark) instrument, and in the instrument of FIG. 2 using the invention. In FIG. 9 matrix effect is plotted on the vertical axis and analyte mass to charge ratio on the horizontal axis. Matrix effect is defined (for purposes of testing) as:

$$\text{matrix effect} = \frac{\text{(sensitivity to the analyte in 1000 ppm thalliun solution)}}{\text{(sensitivity to the analyte in 2.5\% nitric acid/distilled de-ionized water solution)}}$$

the denominator representing a clean solution. It will be appreciated that the analyte concentration is typically of the order of 0.01 ppm, i.e. much less than that of the thallium.

In FIG. 9 the matrix effect as defined above using a standard "Elan" (trade mark) instrument is shown at curve 120, and the matrix effect as defined above using a reducer according to the invention is shown at curve 122. It will be seen that for a standard "Elan" (trade mark) instrument, the matrix effect (curve 120) varies substantially with analyte mass. With the method of the invention, the matrix effect is reduced, i.e. curve 122 is closer to a value of 1.0 (at which value the matrix effect disappears). In addition curve 122 is more independent of analyte mass. Thus, the use of the invention reduces both mass bias, and mass dependence of matrix effects.

As indicated, the FIG. 2 arrangement also achieves economies in vacuum pumping. Preferably chamber 74 is pumped to between 0.1 and 0.3 Torr. Ion transmission is high at this pressure, and because of the relatively high pressure, the neutrality of the flow through chamber 74 is ensured.

Since roughing pump 48 conveniently provides a region at 0.1 to 0.3 Torr, chamber 74 can be connected by duct 130 (FIG. 2) to roughing pump 48, thereby eliminating the need for a separate pump for chamber 74. In addition, because reducer 70 limits the flow of gas into high vacuum chamber 60, the capacity of turbo pump 62 can be small, e.g. about 50 liters/second with a 0.2 mm diameter reducer orifice 72.

Figure 10:
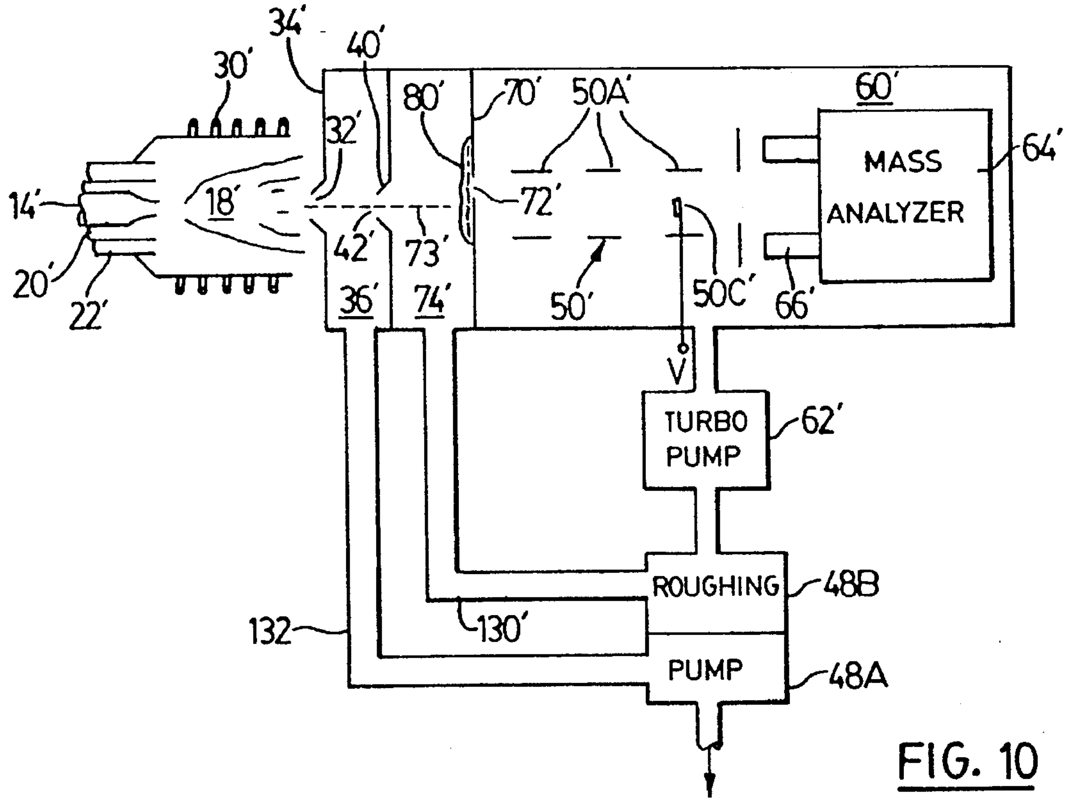
FIG. 10 is a diagrammatic view similar to that of FIG. 2 but showing a modified embodiment of the invention.

In addition, since roughing pump 48 can be a two stage pump (having as shown in FIG. 10 a first stage 48A which pumps down to 5 Torr and a second stage 48B which pumps down to 0.1 Torr), the first vacuum chamber 36' can be evacuated by a duct 132 connected to stage 48A, with duct 130' connected to stage 48B, as shown in FIG. 10 where primed reference numerals indicate parts corresponding to those of FIG. 2. This further reduces the hardware requirements.

Figure 11:
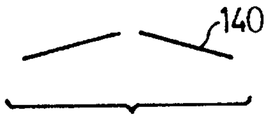
FIG. 11 shows a modified reducer plate according to the invention.
Figure 12:
FIG. 12 shows a further modified reducer plate according to the invention.

Although the reducer plate 70 has been shown as flat, it can if desired be a blunt cone as shown at 140 in FIG. 11, or can be a large diameter curved surface as shown at 142 in FIG. 12, so long as a shock wave forms over its surface. Because the shock wave spreads across the surface of the reducer, the ions can be sampled through a reducer orifice which is offset from the common axis 73 through the sampler and skimmer orifices.

Figure 13:
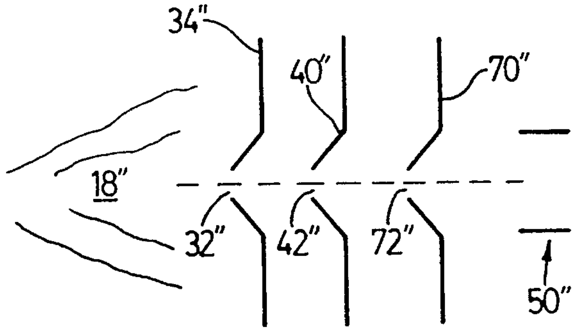
FIG. 13 shows a further modified arrangement of sampler, skimmer and reducer plates according to the invention.

Alternatively, and as shown in FIG. 13 where double primed reference numerals indicate parts corresponding to those of FIGS. 1 and 2, the reducer plate 70" can be sharp tipped, like the skimmer 40" but with a smaller aperture. In this case, no shock wave will form at orifice 72", and therefore the three orifices 32", 42" and 72" must all be aligned on a common axis 146 since otherwise no ions will pass through reducer orifice 72". This arrangement also has the advantage of reducing pumping requirements and permitting the same pump to be used both as roughing pump for chamber 60', and to evacuate chamber 74'. However it suffers from the disadvantage that the very small reducer orifice 72" is now exposed to a beam of matter from the plasma and tends to clog quickly. Therefore the FIG. 13 arrangement is not preferred.

Figure 14:
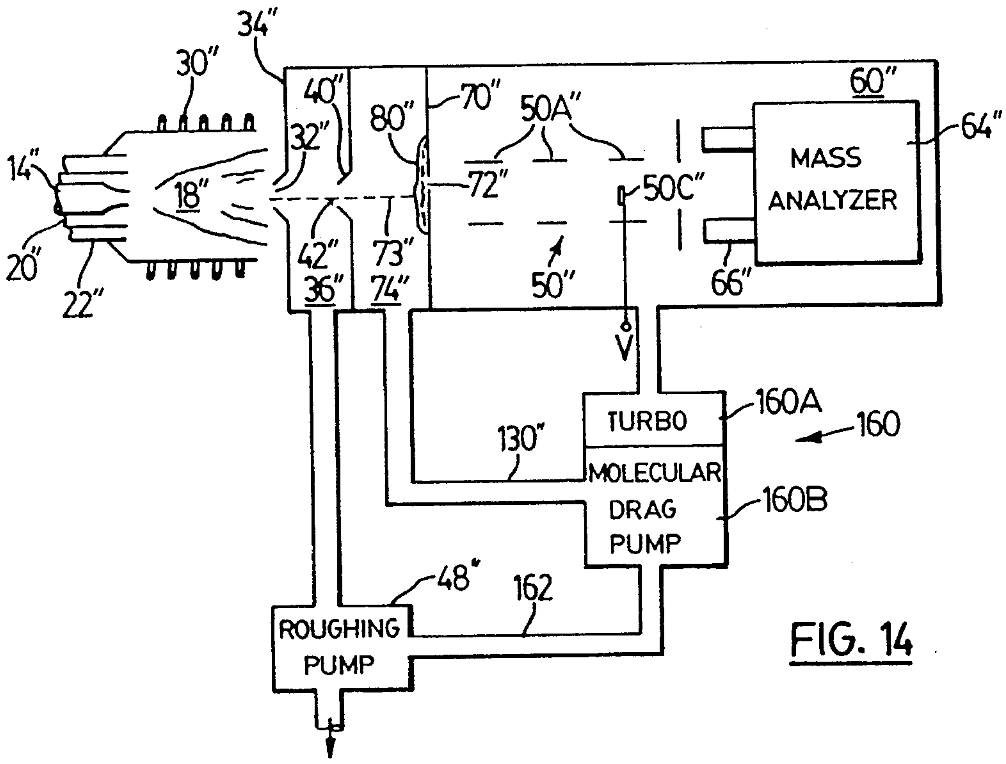
FIG. 14 is a diagrammatic view similar to those of FIGS. 2 and 10 but showing another modification of the invention.

Reference is next made to FIG. 14, which shows a further modified version of the invention and in which double primed reference numerals indicate parts corresponding to those of FIGS. 2 and 10. FIG. 14 illustrates the use of a high speed vacuum pump 160 which includes a turbo pump portion 160A discharging into a molecular drag pump portion 160B (such pumps are currently widely commercially available). The molecular drag pump portion 160B provides a 0.1 Torr region into which the turbo pump portion 160A may discharge, and can itself discharge into a higher pressure region of about 5.0 Torr. Therefore, chamber 60" is evacuated by pump 160, while chamber 74" (which is at about 0.1 Torr) is pumped through duct 130" by the molecular drag pump portion 160B. The molecular drag pump portion 160B, which must typically discharge into a region less than about 5 to 10 Torr, is connected via duct 162 to roughing pump 48". Roughing pump 48" also evacuates chamber 36", since that chamber conveniently must also be evacuated to between 1 and 5 Torr. It will be seen that again, only one high speed vacuum pump (evacuating to $10^{-5}$ to $10^{-6}$ Torr) is needed, together with one roughing pump.

Figure 15:
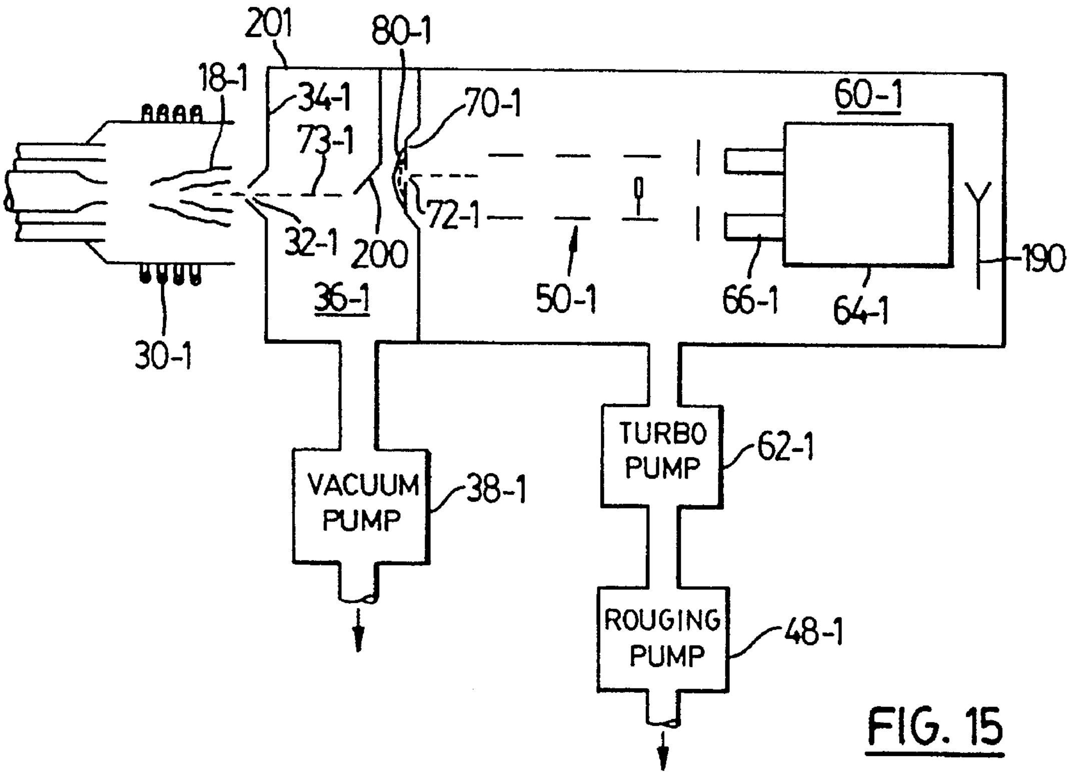
FIG. 15 is a diagrammatic view similar to those of FIGS. 2 and 10 but showing a further modification of the invention.
Figure 16:
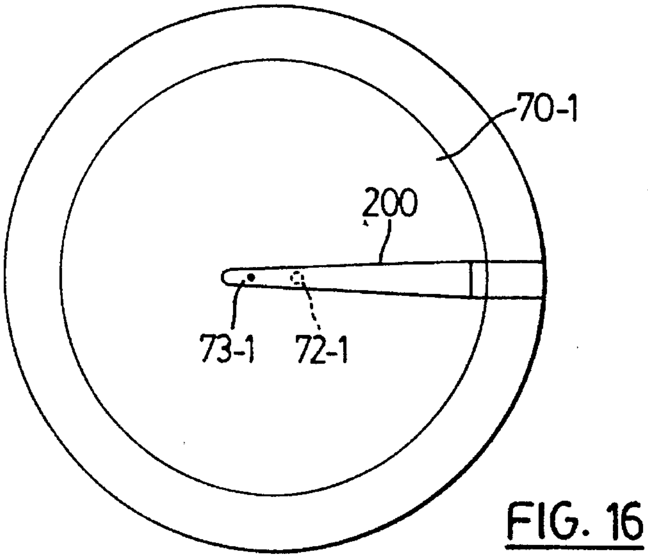
FIG. 16 is an axial view of a portion of the apparatus of FIG. 15.

Reference is next made to FIGS. 15 and 16, which show another modification of the invention. The FIGS. 15 and 16 embodiment is generally similar to that of FIG. 2, and reference numerals ending with the suffix "–1" indicate parts corresponding to those of FIG. 2. In addition the ion detector which detects ions passing through the mass analyzer is indicated at 190.

The major difference between the FIGS. 15 and 16 version and that of FIG. 2 is that in FIGS. 15 and 16, the skimmer 40 has been removed and has been replaced by a beam blocker or particulate blocker 200. In addition, there is now only one chamber 36-1 instead of two chambers, 36, 74. It will be realized that an important purpose of the skimmer is to reduce the gas load entering the vacuum chamber 60, with minimal disturbance to the flow. In effect the skimmer "skims" the flow. The reducer 70-4 now, among its other functions, reduces the flow of gas to vacuum chamber 60-1, but it does not "skim" the beam. In fact it drastically disrupts the beam, by interposing a blunt surface in the path of the beam, thus causing a shock wave 80-1 to form. As before, the shock wave 80-1 spreads across the reducer 70-1 and is sampled through the orifice 72-1.

Without a skimmer, there is an increased thermal load on the reducer 70-1, which load is accommodated by connecting the reducer to wall 201 of chamber 36-1. Wall 201 is air or water cooled (by means not shown). There is also an increased ion flux which can be dealt with by providing a smaller aperture 72-1 in the reducer. However to prevent the aperture 72-1 from clogging, the beam blocker 200 is provided. The beam blocker 200 should also be thermally connected to cooled chamber wall 201, so that it does not melt. As before, the sampler 34-1, reducer 70-1 and beam blocker 200 are all preferably grounded, although they may be electrically biased relative to each other by a low voltage such as 10 volts DC or less.

When a skimmer was used, the beam emerging from the skimmer orifice 42 was relatively narrow, and it was sufficient to offset the reducer orifice slightly from the skimmer orifice (as shown in FIG. 4A). However the flow from the sampler orifice 32-1 has a very wide radial distribution. In addition, the sampler orifice 32-1 acts like a point source, with particulates travelling therefrom in straight line trajectories. Therefore, the beam blocker 200 shadows orifice 72-1 of the reducer from orifice 32-1 of the sampler by extending across a line of sight (i.e. a straight line) drawn between these two orifices. In addition, as before the reducer orifice 72-1 is offset axially from the sampler orifice 32-1. This is also shown in FIG. 16, where the point at which line 73-1 intersects beam blocker 200 is indicated at 73-1, and the reducer orifice is shown in dotted lines at 72-1.

Figure 17:
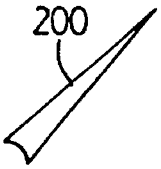
FIG. 17 is a perspective view of a beam blocker of FIG. 15.

The beam blocker 200 preferably slopes forwardly into the gaseous expansion at substantially the same angle as the skimmer cone and in fact can consist of a small sharp tipped sector of the skimmer cone, as shown in FIG. 17. This design reduces interference with the flow.

It will be appreciated that as the beam blocker 200 is made larger (i.e. as the circular angle through which it extends is made larger), eventually it will become a skimmer, so that a skimmer is at least in some respects, a special case of a beam blocker.

Figure 19:
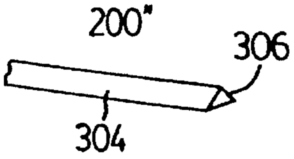
FIG. 19 is a perspective view of another modified beam blocker.
Figure 18:
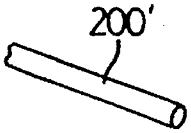
FIG. 18 is a perspective view of a modified beam blocker.

While the beam blocker 200 has been shown as a tapered finger, in the extreme it can be a suitably dimensioned wire, so long as the wire is made of an appropriate material and is thermally connected to cooled chamber wall 201 so that it will not melt. Such a wire is shown at 200' in FIG. 18. Wire 200' is of circular cross-section, but other cross-sections (e.g. elliptical or tear-drop shaped) can also be used. Alternatively a triangular cross-section can be used, as shown at 200" in FIG. 19.

Figure 19A:
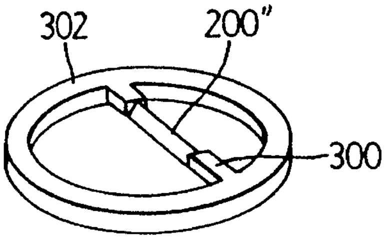
FIG. 19A is a perspective view of another modified beam blocker.

Instead of forming beam blocker 200 with a free end, it can be a finger-like member extending entirely across chamber 36-1 so as to be connected to the chamber wall at each end. An embodiment having this design is shown in FIG. 19A. As shown in FIG. 19A, the beam blocker has the triangular configuration shown in FIG. 19 and therefore is indicated at 200". Beam blocker 200" is machined from a rectangular or square bar 300 which is joined or integral with a circular ring 302 which fits snugly within chamber 36-1 and contacts the cooled wall 201 around the periphery of ring 302. This design provides improved cooling for the beam blocker 200". Typically the angle between sides 304, 306 (FIG. 19) of the triangular beam blocker 200" is the same as the angle of the skimmer cone 40, for minimal disturbance to the flow.

Figure 19B:
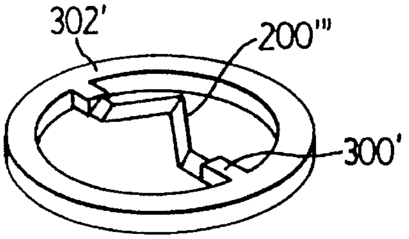
FIG. 19B is a perspective view of a still further modified beam blocker.

FIG. 19B shows another form of beam blocker 200"' which is also connected at both ends to ring 302'. The only difference between the FIGS. 19A and 19B versions is that in FIG. 19B, the beam blocker 200"', besides being triangular in cross-section, is also V-shaped as seen from the side, again to reduce interference with the gas flow.

With the embodiments shown in FIGS. 15 to 19, where the skimmer has been replaced by a beam blocker, it will be realized that the beam blocker 200 has little effect on the pressure in chamber 36-1, other than producing a local wake downstream of the beam blocker. The pressure in chamber 36-1 should be sufficiently low that the background gas in chamber 36-1 will not disturb the beam and hence will not prevent a reasonably full strength shock wave from forming on reducer member 70-1. In a full strength shock wave, the axial directed kinetic energy of the portion of the beam of gas travelling through sampler orifice 32-1 which impinges on the blunt reducer member 70-1 should not be disturbed, so that all or substantially all of the kinetic energy in such portion is converted into random kinetic energy in the shock wave 80-1 on reducer member 70-1.

It will be recalled that for the three aperture interface shown in FIGS. 2 through 14, the pressure in chamber 74 between the skimmer and reducer was between $10^{-3}$ and 0.5 Torr, preferable 0.1 Torr to 0.3 Torr. This relatively low pressure was needed in order to retain the beam formation through the relatively long distance between the sampler and the reducer. The pressure in the first chamber 36 between the sampler and skimmer was, however, a few Torr, e.g. 1 to 5 Torr.

With the two aperture interface shown in FIGS. 15 to 19, the pressure between the sampler and reducer can be approximately the same as that which existed between the sampler and skimmer in the three aperture interface, e.g. a few Torr (e.g. 1 to 5 Torr). In the relatively short distance between the sampler and skimmer, this pressure is sufficiently low to permit adequate beam formation, to form a shock wave.

The spacing between reducer member 70-1 and the sampler 34-1 depends in large part on the size of the pump used to exhaust chamber 36-1. If the distance is too large, a larger pump 38-1 is needed to maintain the pressure in chamber 36-1 sufficiently low for an undisturbed shock wave to form. If the spacing is too small, the parts become difficult to fabricate and in addition the heat load on beam blocker 200 can become too high.

Typically the distance between reducer 70-1 and sampler 34-1 will be between about 5 and 12 mm, although the distance can be increased if a larger vacuum pump 38-1 is used. The distance between beam blocker 200 and reducer 70-1 is usually quite small, e.g. as little as 1 to 2 mm, although this distance can be increased e.g. to 9 mm with the use of a larger vacuum pump. (If the beam blocker is a skimmer, then larger spacing can be used with staged pumping.)

The space between the beam blocker 200 and the sampler orifice 32-1 should be at least about 4 mm, since if the spacing is too small, the beam blocker 200 may become too hot and may also disturb too much of the flow. However the dimensions given are illustrative and particular dimensions may be selected depending on the application, having regard to the factors described.

The two aperture interface shown in FIGS. 15 to 18 is simpler and cheaper to build and less troublesome to operate than the previous embodiments. It is cheaper to build because one vacuum chamber has been eliminated, a connection from that chamber to a pump has been removed, and the skimmer with its precision aperture has been replaced by a simple beam blocker. It is less troublesome to operate because it has only one aperture to clog (the sampler aperture), rather than two apertures (the sampler and skimmer) as in the case of the three aperture interface or as in the case of a conventional instrument (which also has a sampler and a skimmer). (The reducer orifice does not normally clog since it is shadowed.) Since dirty samples (e.g. those with high salt concentrations or which contain refractory elements which form oxides easily) are a well known problem with ICP-MS, the ability to have a single orifice rather than two which may clog can be a considerable advantage.

Figure 20:
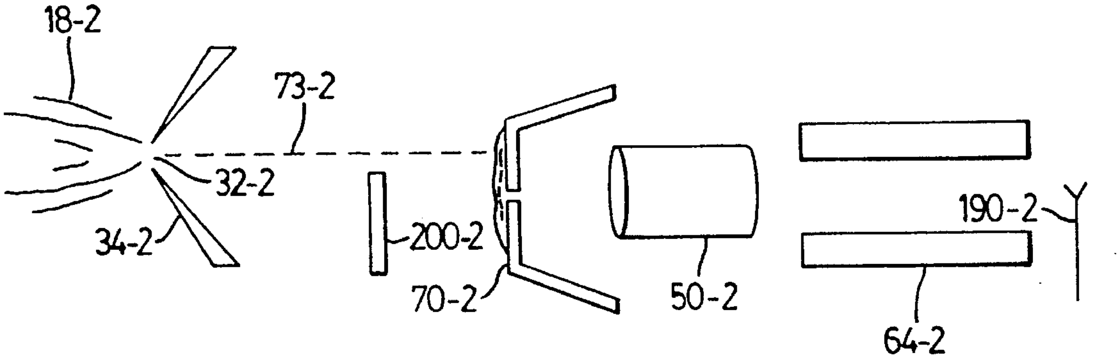
FIG. 20 is a diagrammatic view similar to that of FIG. 15 but showing a further modification of the invention.

Reference is next made to the FIG. 20 embodiment, in which reference numerals ending with the suffix "–2" indicate parts corresponding to those of FIGS. 15 to 19. The FIG. 20 embodiment is the same as that shown in FIGS. 15 to 19 except that beam blocker 200-2 is oriented at 90° to the axis 73-2 of the expansion, rather than sloping forwardly as in FIGS. 15 to 19. The beam blocker 200-2 may create slightly more disturbance to the flow but will otherwise function substantially the same as the FIGS. 15 to 19 embodiment.

Figure 21:
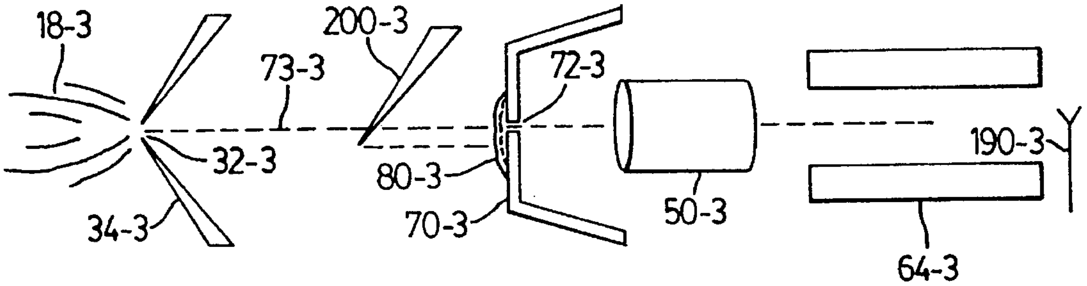
FIG. 21 is a diagrammatic view similar to that of FIG. 15 but showing yet another embodiment of the invention.
Figure 22:
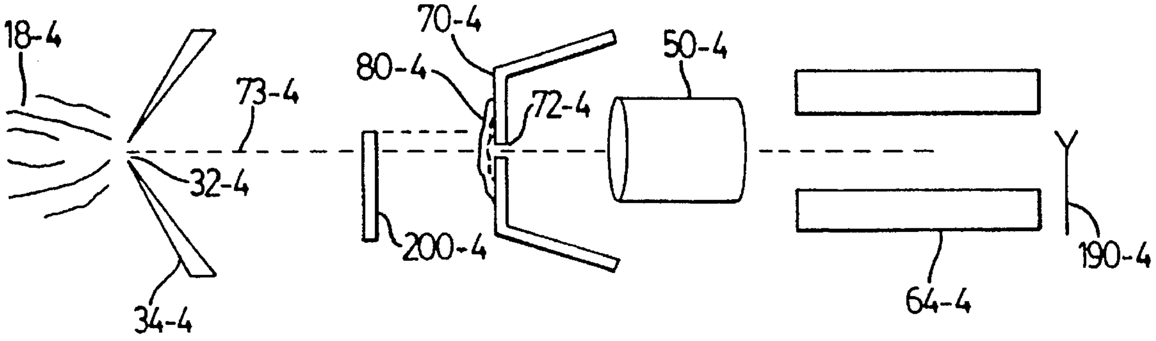
FIG. 22 is a diagrammatic view similar to that of FIG. 15 but showing a further modification of the invention.

Reference is next made to FIGS. 21 and 22, in which reference numerals with the suffixes "–3" and "–4" indicate parts corresponding to those of FIGS. 15 to 20. The FIGS. 21 and 22 embodiments are the same as those of FIGS. 15 and 20 respectively, except that in FIGS. 21 and 22 the sampler orifices 32-3, 32-4 are axially aligned with the reducer orifices 72-3, 72-4 respectively. However the beam blocker 200-3, 200-4 blocks the line of sight between the two orifices, in effect shadowing the reducer orifice from the sampler orifice. As before, a shock wave 80-3, 80-4 will form on the blunt reducer plate, will flow over the reducer orifice, and will be sampled through the reducer orifice.

Figure 23:
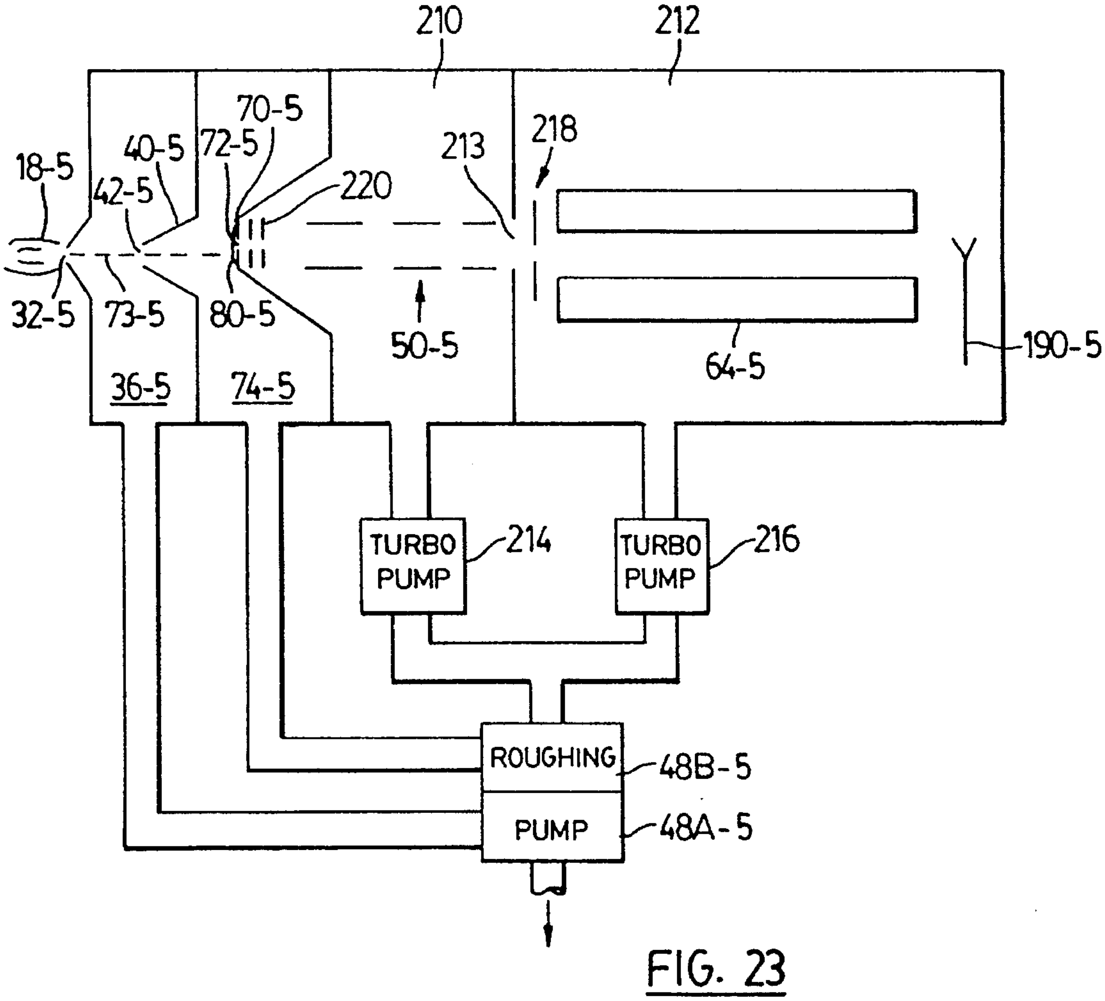
FIG. 23 is a diagrammatic view similar to those of FIGS. 2 and 10 but showing a still further modification of the invention.

Reference is next made to FIG. 23, in which reference numerals ending with the suffix "–5" indicate parts corresponding to those of FIG. 2. The system shown in FIG. 23 is similar to that of FIG. 2 except that the ion optics 50-5 and the mass analyzer 64-5 have been placed in separate vacuum chambers 210, 212. This allows the use of a larger reducer orifice 72-5 than in the previous embodiment (e.g. five times larger in diameter or 25 times larger in area). Even if the reducer orifice 72-5 is the same size or larger than the skimmer orifice 32-5, it will still reduce the ion flux into the ion optics vacuum chamber 210, as compared with not having a reducer, and will therefore still reduce space charge effects. With a larger ion flux the space charge effects are of course increased as compared with the previous embodiments, but the mass dependency of the matrix effects will still be reduced as compared with not having a reducer. The orifice 213 between chambers 210, 212 is larger, e.g. 1 to 10 mm.

The vacuum chambers 210, 212 are pumped by turbo pumps 214, 216 respectively. As in the FIG. 10 embodiment, the turbo pumps 214, 216 may be backed by a two stage roughing pump 48A-5, 48B-5, which also evacuates chambers 36-5, 74-5. Diffusion or other suitable pumps may also be used.

The pressures in vacuum chambers 36-5, 74-5 are typically, as before, several Torr (e.g. 1 to 5 Torr), and $10^{-2}$ Torr to 0.5 Torr respectively. The pressure in chamber 210 is less than $10^{-2}$ Torr and may typically be $5\times10^{-4}$ Torr. The pressure in chamber 212 is typically $2\times10^{-5}$ Torr.

Vacuum chamber 212 may if desired contain additional ion lenses 218, which can be short RF rods or electrostatic lenses depending on the application. The aperture 213 can be made part of these lenses;

If desired, an ion extraction lens 220 may be placed immediately downstream of the reducer orifice 72-5. Because the gas density is much lower here than immediately downstream of the skimmer orifice, there is less likelihood of creating energy spreads from collisions between the ions and the gas. The ion extraction lens may have a potential of between −20 and −100 volts, or even higher, to accelerate the ions as soon as they emerge from the reducer orifice 72-5. This has the advantage of reducing space charge effects and consequent matrix effects, but has the disadvantage that either the ions must be slowed down afterwards, or else a mass analyzer must be used which can accept higher kinetic energy ions. (Ion extraction lenses are well known and are described for example in an article by J. H. Whealton et al. entitled "Effect of Pre-Acceleration Voltage Upon Ion Beam Divergence" in Journal of Applied Physics, Vol. 49, June 1978, pages 3091–3101. In such lenses typically there is a first lens element one or two orifice diameters downstream of the reducer, e.g. at −20 to −100 volts, and another lens element one-half to one orifice diameter downstream of the previous lens element. The second lens element is usually grounded or at a lower potential than the first lens element.)

While a full skimmer and two chambers 36-5, 74-5 have been shown in FIG. 23, if desired this arrangement can be replaced by a single chamber with a beam blocker, as shown in FIGS. 15 to 22. Here as well the pressure downstream of the reducer is sufficiently low (less than $10^{-2}$ Torr and typically $10^{-4}$ Torr), because of the small reducer orifice, that large ion energy spreads are not created.

While several embodiments of the invention have been described, it will be appreciated that various changes can be made within the scope and spirit of the invention.

We claim:

1. A method of analyzing an analyte contained in a plasma, said method comprising:

(a) drawing a sample of said plasma through an orifice in a sampler member, (b) directing at least a portion of said sample, at supersonic velocity, onto a substantially blunt reducer member containing an orifice, to form on said reducer member a shock wave containing at least some of said sample portion, (c) shadowing said orifice of said reducer member from said orifice of said sampler member with a blocking member, to reduce the likelihood of clogging said orifice in said reducer member, (d) drawing a part of said sample portion through said orifice in said reducer member and into a vacuum chamber, (e) directing ions in said part into a mass analyzer and analyzing said ions in said mass analyzer.

2. A method according to claim 1 wherein said orifices in said sampler member and reducer member are aligned on a common axis and said blocking member extends across said axis.

3. A method according to claim 1 wherein said orifice in said reducer member is offset from said orifice in said sampler member.

4. A method according to claim 1 wherein the sample portion passing through said orifices in said sampler member and said reducer member are substantially neutral.

5. A method according to claim 1 wherein said blocking member is a cone-shaped skimmer having an orifice therein to permit passage therethrough of a portion of said sample drawn through said orifice in said sampler member.

6. A method according to claim 5 wherein the pressure between said skimmer and reducer member is between $10^{-3}$ Torr and 0.5 Torr.

7. A method according to claim 1 wherein said blocking member has the shape of a thin finger-like member.

8. A method according to claim 7 wherein said finger-like member slopes towards said sampler member.

9. A method according to claim 7 wherein said finger-like member has a pair of ends, said method including the step of cooling said member at each of said ends.

10. A method according to claim 6 wherein the sample drawn through said orifice in said sampler member expands along an axis through said orifice in said sampler member, and wherein said finger-like member extends at substantially right angles to said axis.

11. A method according to claim 7 wherein the pressure between said sampler member and reducer member is of the order of a few Torr.

12. A method according to claim 11 wherein the pressure between said sampler member and reducer member is between 1 Torr and 5 Torr.

13. A method according to any of claims 1 to 12 wherein the voltage between said sampler member and blocking member does not exceed about 10 volts DC, and the voltage between said sampler member and reducer member does not exceed about 10 volts DC.

14. A method according to any of claims 1 to 12 and including the step of accelerating ions downstream of said orifice in said reducer member.

15. Apparatus for performing mass analysis of an analyte contained in a plasma, said apparatus comprising:

(a) a sampler member having a sampler orifice therein for sampling said plasma, (b) a reducer member spaced from said sampler member and having a reducer orifice therein, (c) a blocking member located between said sampler and reducer members and extending across a line of sight between said orifices in said sampler and reducer members to occlude said orifice in said sampler member from said orifice in said reducer member, (d) a vacuum chamber having an inlet wall, said reducer member forming a portion of said inlet wall, said vacuum chamber including means therein for directing, for analysis, ions from said plasma passing through said orifices, (e) said reducer member being substantially blunt adjacent said reducer orifice for a shock wave to form on said reducer member adjacent said reducer orifice and for ions in said shock wave to be drawn through said reducer orifice.

16. Apparatus according to claim 15 wherein said blocking member is a cone-shaped skimmer having an orifice therein to permit passage of a portion of said sample passing through said sampler member.

17. Apparatus according to claim 15 wherein said blocking member has the shape of a thin finger-like member.

18. Apparatus according to claim 17 wherein said finger-like member slopes toward said sampler member.

19. Apparatus according to claim 17 and including a cooled wall extending between said sampler member and said reducer member, and wherein said finger-like member has a pair of ends, and means thermally connecting each of said ends to said cooled wall.

20. Apparatus according to claim 17 wherein there is an axis extending perpendicular to said blunt portion of said reducer member through said orifice in said sampler member, and said finger-like member extends at right angles to said axis.

21. Apparatus according to any of claims 15 to 20 and including means for maintaining the voltage difference between said sampler and blocking members at not greater than 10 volts DC, and for maintaining the voltage difference between said sampler member and reducer member at not greater than about 10 volts DC.

22. Apparatus according to claim 15 and including a further vacuum chamber positioned downstream of said first mentioned vacuum chamber for receiving ions from said first mentioned vacuum chamber, and a mass analyzer in said further vacuum chamber for analyzing said ions.

23. Apparatus according to claim 22 and including an ion extraction lens in said first mentioned vacuum chamber, said ion extraction lens being positioned immediately downstream of said reducer orifice.

24. Apparatus for performing mass analysis of an analyte contained in a plasma, said apparatus comprising:

(a) a sampler member having a sampler orifice therein for sampling said plasma and for permitting a stream of ions and gas sampled from said plasma to pass through said sampler orifice, (b) a reducer member spaced from said sampler member and having a reducer orifice therein, (c) a blocking member located between said sampler and reducer members and extending across a line of sight between said orifices ion said sampler and reducer members to occlude said orifice in said sampler member from said orifice in said reducer member, said blocking member having the form of a narrow finger and creating a wake, behind said blocking member, in said stream of ions and gas, (d) heat sink means connected to said blocking member to cool said blocking member, (e) a first vacuum chamber having an inlet wall, said reducer member forming a portion of said inlet wall, said first vacuum chamber including means therein for directing, for analysis, ions from said plasma passing through said orifices, (f) a second vacuum chamber positioned downstream of said first vacuum chamber positioned downstream of said first vacuum chamber for receiving ions from said first vacuum chamber, and a mass analyzer in said second vacuum chamber for analyzing said ions, (g) and means for electrically connecting said sampler member, said blocking member and said reducer member for the voltage between said sampler member and said blocking member not to exceed about 10 volts DC, and the voltage between said sampler member and reducer member not to exceed about 10 volts DC.

25. Apparatus according to claim 24 wherein said sampler member, said reducer member and said blocking member are all grounded.

* * * * *